W. A. FLANDERS.
Bee Hive.
No. 27,408.
Patented March 6, 1860.
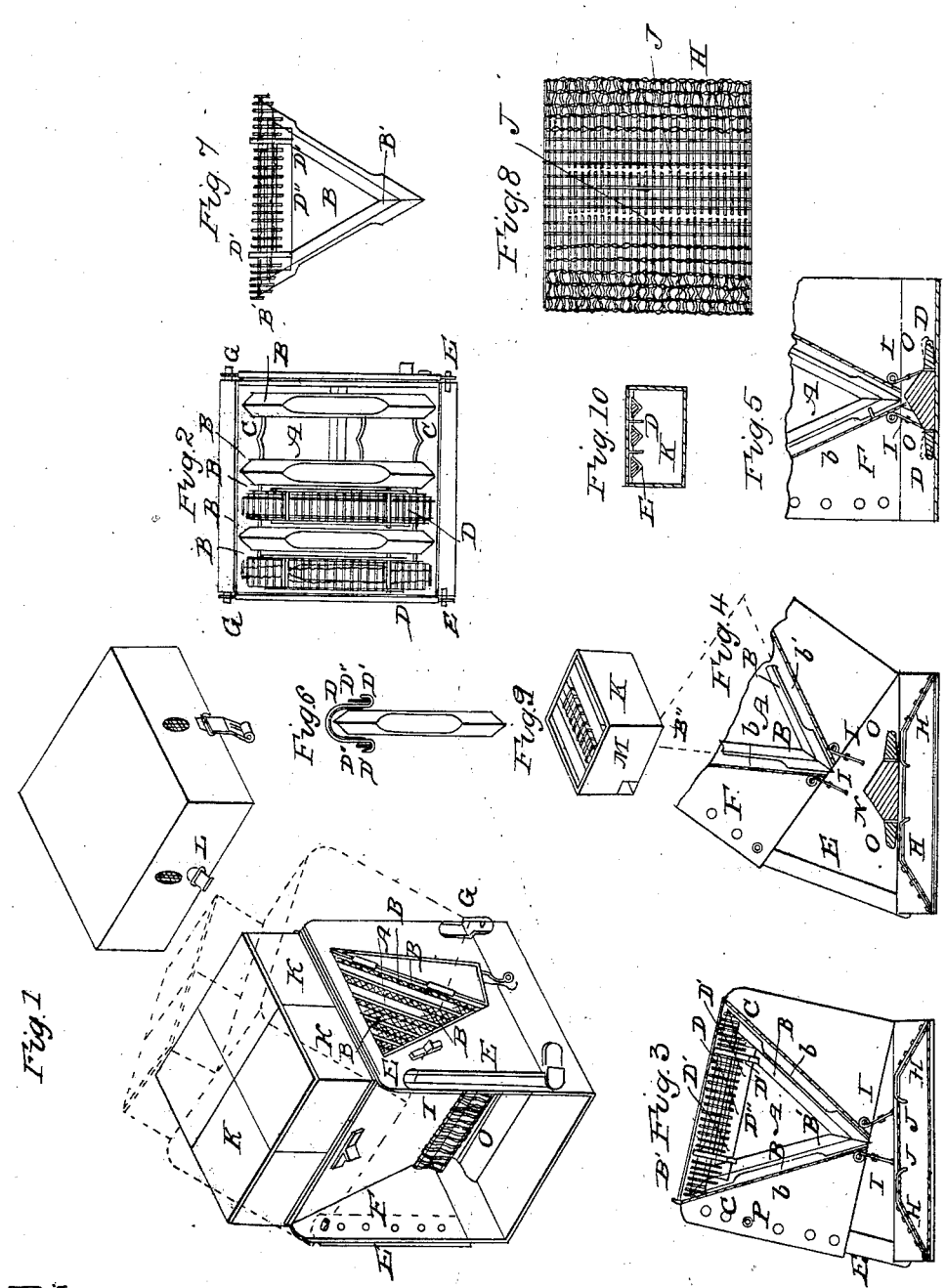

UNITED STATES PATENT OFFICE.

W. A. FLANDERS, OF CLEVELAND, OHIO, ASSIGNOR TO HIMSELF AND T. W. BOYCE, OF SAME PLACE.

BEEHIVE.

Specification of Letters Patent No. 27,408, dated March 6, 1860.

*To all whom it may concern:*

Be it known that I, W. A. FLANDERS, of Cleveland, in the county of Cuyahoga and State of Ohio, have invented new and useful Improvements in Beehives; and I do hereby declare that the following is a full and complete description of the construction and operation of the same, reference being had to the accompanying drawings, making part of the same, in which—

Figure 1, is a perspective view, with the cover removed; Fig. 2 is a plan view, with the cover and upper boxes removed; Fig. 3, is a vertical section, with the cover and boxes removed. The other views are detached sections, which will be referred to in the description following.

Like letters refer to like parts in the several views.

The general form of the hive, is seen in Fig. 1. In the chambers A, are arranged a series of triangular reversible frames B, as seen in Figs. 2, 3, 4 and 5. Figs. 6 and 7, represent an end and side view of the frames detached from the hive. These frames are hung upon the wire brackets C, Figs. 2 and 3, so that they will hang, suspended in the chamber A, which is of a triangular form, its sides corresponding with the frame. The chamber A, may be of any desirable length, according to the number of frames required, and a greater or less number of frames may be hung in the chamber, in accordance with the number of bees in the hive. To the top of the frames, I connect adjustable comb guides, Figs. 2, 6 and 7, which may be changed from one part to another, if required, which consists of the wire gauze saddle D, or its equivalent. To this gauze, is attached two hooks D′ D′, on each side, to which is hung a glass plate D″ D″, or its equivalent, on each side—forming the comb guides. By means of these guides, the bees in working down from the top of each frame, when it is the widest, will, of necessity make the comb straight, as the comb guides are parallel to each other and to the frame on each side. The comb, being worked straight, at the widest part of the frame, it will be continued the same below the guides, and as the space contracts downward to the lower angle of the frame upon them where there is less liability in filling up the frame; as the bees will work downward, in nearly a straight line, without attaching the comb to that of the adjoining frame, which allows any of them to be withdrawn from the hive without disturbing any of the adjoining frames.

Ordinarily, the bees in working without the comb guides, would bend or curve the comb, so that it would become attached to the adjoining frames. Here the difficulty is avoided, attendant upon the frames of former arrangements, by the breaking of the comb—wasting the honey, deranging the hive, and destroying the bees in withdrawing and replacing the frames. These frames are so arranged in relation to the chamber, that any of the frames may be changed from one place to another, also turned or reversed so that either point of the angle of the frame may depend.

Bees always commence at the lower part of the hive to feed, and work upward, and clean out the comb for the deposit of the egg as they proceed, consequently the bees would begin at the lower angle B′, Figs. 3 and 7, of the frame, and after the egg has been deposited, the frame should be turned so that the angle B′ will be at B″, which will compel the bees to eat out the upper part of the hive. In December, the comb should be turned and in the early part of March, turned back again, at which time, the hive should be raised, as indicated by the dotted lines in Fig. 1, and as seen in Fig. 4. The hive is held in this inclined position by the adjusting arms placed on each side of the hive, as shown at E, E, Figs. 1 and 2. To the upper end of these arms, is attached a finger, which enters the holes F; by this arrangement of the arms, fingers and holes, the hive may be secured at the desired inclination, and as the upper part of the hive, is hinged at G, G, Figs. 1 and 2 to the lower part, it follows that it may readily be raised and lowered on the hinge, so as to tilt or incline the hive, as the nature of the case may require.

Where the hive is inclined, as seen in Fig. 4 and the comb turned back, after being turned down in December, as before stated, the animal heat from the bees, is concentrated upon the brood, as the heat from the bees below, will rise to the top of the comb, and surround the brood, and develop it with more vigor, than if the bees were working above the brood, as the cold air below and around the brood would retard its maturing.

It will be noted, that by reversing the frames as before stated, the brood attains the position of B″ in Fig. 4, while the bees are at B′ hence, the brood will not only be brought to maturity more quickly, but it will be more vigorous, than if these relative positions were not changed. This inclination of the hive, also very materially assists weak colonies, in commencing comb building in the points of the angles, and the frame, by its peculiar form, gives the greatest amount of space over them in a given capacity for boxes. The sides of the frames are chamfered off at $b$, to allow the bees to pass around the frames when at work in the hive.

The form of the case inclosing the frames, greatly assists the bees in cleaning out the hive, and the litter is packed into the cracks below and beneath the moth trap where the worm hatches, and will remain till destroyed, while the bottom board or play ground for the miller is thrown outside of the hive. This form for a frame is also cheaper than others, or square frames, as there are only three corners to the frame, and the sticks being turned corner wise, saves chamfering, or cutting off the corners.

It is desirable to produce thick combs, in the spare honey receptacles or boxes K, Figs. 1, 9 and 10, being a vertical section of the same. There has heretofore been no sure method to compel the bees to construct such combs. By the use of the guide combs or wire gauze D Figs. 6, and 10, and the triangular bars, secured beneath a plate of glass, they will invariably construct the combs sufficiently wide to fill the space between the points of the teeth in the guide combs. This method is preferred for securing the virgin honey, as the cells in the thick combs, are free from brood, and the honey is of the nicest quality. It is also much less trouble to remove the cover in this manner, as it is easily done, by pouring a little hot water on the glass cover placed upon the bars F, Fig. 10, which softens the wax beneath the glass, when it is easily removed by simply turning it a little and raising it, when the bars beneath can be removed, and the comb with it, and the cover placed loosely over the box without nailing, as the bees will do all the fastening required. This method secures the honey in the most convenient and salable form, at a much cheaper rate than where nailing is required. It is also desirable to do no nailing while the bees are at work, which can be avoided in no other way, so well, as by means of the above described arrangement, for the boxes, and other parts connected therewith.

The entrance for the bees into the boxes K, is through the opening L, in the cover, Fig. 1, and opening M in the boxes. The bees can enter these boxes from the hive below, through openings in the floor of the boxes.

The ingress and egress for the bees to and from the hive, is through the lower angle of the case or chamber A, Figs. 3, 4 and 5, over the double inclined planes N, which have the wings O O attached on either side, as seen in Figs. 3, 4 and 5. This device serves a double purpose of throwing off the filth, as it falls from the comb above; and also serves to greatly assist the bees in entering and leaving the hive. It also forms a convenient deposit for the miller's eggs, as the worm will pass beneath the adjustable wings, and may be destroyed by pressing the wings closely to the bottom of the hive, or the trap may be removed, and the moth secured. This device may also be raised, to close the hive, while removing the same, and may also be made use of in combination with the drone separator, to raise the inclined plane, so as to enable the bees to enter the hive while it has the required inclination, as seen in Fig. 4.

We often find a superabundance of drones in the colony, and it is desirable to separate them from the working bees, in order to destroy them. For this purpose, I employ the separator H, as seen in Fig. 8. This separator is constructed of wire gauze, the meshes of which are sufficiently large to permit the working bees to pass through them, and not large enough to let the drones escape. By placing this separator below the angle of the hive, as seen at Fig 3, and dropping the wings I, attached to the bottom of the hive, the drones are then compelled to pass out of the hive between the wings, as seen in Fig. 3. They then return, and attempt to go into the hive through the meshes of the said wings, but are unable to do so— on account of the meshes being too small, for the drones, (but large enough for the working bees to pass,) and they consequently pass through the panels J J into the interior of the separator, and are instantly captured, and may be destroyed in any convenient manner.

Some of the advantages gained by reversing the position of the comb, may be named as follows: At the period for developing the brood, that part of the comb containing the eggs, is brought into the upper part of the hive by the changing of the triangular frames, or elevating one side of the hive as stated or by the combined action of both, where the animal heat from the feeding swarm, which is thus compelled to remain below in order to obtain food, increases the temperature to such a degree as to bring forward the young brood, in the early part of the season. And further, any honey that might remain over from one season to another if the position was not changed, will become crystallized, in the cells, but by reversing the position of the comb as above stated, the bees, from their natural instinct, will commence to feed at the lower part of the hive, and in this manner, all the old honey will be consumed in the early part of winter.

By constructing the frames in a triangular form they are more easily removed, for there will be always little inequalities in the surface of the comb, and the frames often need to be moved laterally, in order to prevent breaking the surface of the comb. The triangular form enables me to accomplish this, which could not be done if the frames were square.

I do not broadly claim, either a drone separator, a moth trap or a hinged and adjustable inclined plane for the bees to pass over in entering the hive, but confine my claims to the peculiar improvements set forth and claimed.

Having thus fully described my invention what I claim and desire to secure by Letters Patent of the United States is:

1. I claim the combination of the triangular reversible comb-frame or comb-frames B, B, and the angular adjustable case or chamber A, or their equivalents, arranged substantially in the manner and for the purposes set forth.

2. I claim the mechanism or means, arranged substantially as described, or their equivalents, by which I am enabled to adjust or place the embryo brood, contained within the hive or in the frames, above or nearly above the feeding swarm, in the manner and for the purposes specified.

3. I claim the improvement in the comb guide consisting of the wire saddle D, hooks D' and glass plate D'', or their equivalents, constructed and applied in the manner and for the purposes specified.

4. As an improvement in moth traps, I claim the hinged wings O, O, in combination with the central double inclined plane N, the several parts being constructed and arranged in the manner described, for the purposes set forth.

5. I claim the drone separator H provided with the passages J, J, when used in combination with the wings I, I, substantially as set forth, for the purposes specified.

W. A. FLANDERS.

Witnesses:
W. H. BURRIDGE,
HENRY VOTH.